(12) United States Patent
Nusier et al.

(10) Patent No.: US 7,695,052 B2
(45) Date of Patent: Apr. 13, 2010

(54) FRONT RAIL HAVING CONTROLLED THICKNESS FOR ENERGY ABSORPTION

(75) Inventors: Saied Nusier, Canton, MI (US); Jamel E. Belwafa, Ann Arbor, MI (US); Hikmat F. Mahmood, Bloomfield Hills, MI (US); Bahig B Fileta, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/693,789

(22) Filed: Mar. 30, 2007

(65) Prior Publication Data

US 2008/0238146 A1    Oct. 2, 2008

(51) Int. Cl.
*B60J 7/00* (2006.01)
(52) U.S. Cl. .................... 296/187.09; 293/133
(58) Field of Classification Search ............ 296/187.09, 296/187.1, 193.09, 205, 203.02; 293/132, 293/133
See application file for complete search history.

(56) References Cited

U.S. PATENT DOCUMENTS

| | | | | |
|---|---|---|---|---|
| 3,077,355 A | * | 2/1963 | Santesso ..................... 280/748 |
| 3,599,757 A | * | 8/1971 | Takamatsu et al. .......... 188/371 |
| 3,715,130 A | * | 2/1973 | Harada et al. ............... 280/738 |
| 3,998,485 A | * | 12/1976 | Putter et al. .................. 293/133 |
| 4,023,652 A | * | 5/1977 | Torke .......................... 188/377 |
| 4,152,012 A | * | 5/1979 | Reidelbach et al. ......... 280/784 |
| 4,272,114 A | * | 6/1981 | Hirano et al. ................ 293/133 |
| 4,355,844 A | * | 10/1982 | Fantini Muzzarelli ....... 296/205 |
| 5,403,049 A | * | 4/1995 | Ebbinghaus ................. 293/133 |
| 5,429,388 A | * | 7/1995 | Wheatley et al. ............ 280/784 |
| 5,466,033 A | | 11/1995 | Murakami et al. |
| 5,549,327 A | * | 8/1996 | Rusche et al. ............... 280/751 |
| 5,913,565 A | | 6/1999 | Watanabe |
| 6,003,934 A | * | 12/1999 | Usui ...................... 296/203.02 |
| 6,099,071 A | | 8/2000 | Kasuga et al. |
| 6,174,009 B1 | * | 1/2001 | McKeon ...................... 293/133 |
| 6,179,355 B1 | * | 1/2001 | Chou et al. .................. 293/132 |
| 6,293,587 B1 | * | 9/2001 | Lapic et al. .................. 280/784 |
| 6,382,709 B1 | | 5/2002 | Chirifu et al. |
| 6,406,088 B1 | * | 6/2002 | Tate ....................... 296/187.03 |

(Continued)

OTHER PUBLICATIONS

D.C. Han, S.H. Park, Collapse Behavior of Square Thin-Walled Columns Subject to Oblique Loads, Thin-Walled Structures 35 (1999) 167-184, www.elsevier.com/locate/tws.

(Continued)

*Primary Examiner*—Kiran B. Patel
(74) *Attorney, Agent, or Firm*—Frederick Owens; Brooks Kushman P.C.

(57) ABSTRACT

A frame rail for a vehicle that is provided between vehicle frame and the bumper of a vehicle that has a thickness that varies from the front end of the rail to the back end of the rail. The compressive strength of the rail increases from the front end of the rail to the back end of the rail. The rail is rectangular in shape and the thickness of the rail is continuously increased to improve progressive crush characteristics of the rail under an oblique loading. A rail may be provided by providing a tubular rail having a plurality of ring shaped segments that have incrementally increasing thickness. Alternatively, the rail may have a uniformly increasing thickness from the front end to the back end.

15 Claims, 3 Drawing Sheets

U.S. PATENT DOCUMENTS

| | | | |
|---|---|---|---|
| 6,422,604 B2 * | 7/2002 | Lapic | 280/784 |
| 6,474,709 B2 * | 11/2002 | Artner | 293/133 |
| 6,554,333 B2 * | 4/2003 | Shimotsu et al. | 293/132 |
| 6,588,830 B1 * | 7/2003 | Schmidt et al. | 296/187.09 |
| 6,655,728 B2 * | 12/2003 | Sano et al. | 296/187.09 |
| 6,681,907 B2 * | 1/2004 | Le | 188/371 |
| 6,834,898 B2 * | 12/2004 | Wang et al. | 293/118 |
| 6,893,078 B2 * | 5/2005 | Saeki | 296/187.09 |
| 6,899,195 B2 | 5/2005 | Miyasaka | |
| 6,929,297 B2 * | 8/2005 | Muller et al. | 293/133 |
| 6,957,846 B2 * | 10/2005 | Saeki | 296/187.1 |
| 7,070,217 B2 * | 7/2006 | Longo | 293/132 |
| 7,182,191 B2 * | 2/2007 | Scott et al. | 188/372 |
| 7,201,413 B2 * | 4/2007 | Hillekes et al. | 293/133 |
| 7,357,432 B2 * | 4/2008 | Roll et al. | 293/133 |
| 7,357,445 B2 * | 4/2008 | Gross et al. | 296/187.09 |
| 7,416,043 B2 * | 8/2008 | Pipkorn et al. | 180/274 |
| 2006/0125251 A1 * | 6/2006 | Glasgow et al. | 293/132 |
| 2006/0237976 A1 * | 10/2006 | Glasgow et al. | 293/132 |
| 2007/0176442 A1 * | 8/2007 | Mori et al. | 293/133 |
| 2007/0236025 A1 * | 10/2007 | Glasgow et al. | 293/133 |
| 2008/0007088 A1 * | 1/2008 | Newport | 296/187.03 |
| 2008/0106107 A1 * | 5/2008 | Tan et al. | 293/133 |

OTHER PUBLICATIONS

G.M. Nagel, D.P. Thambiratnam, Dynamic Simulation and Energy Absorption of Tapered Thin-Walled Tubes Under Oblique Impact Loading, International Journal of Impact Engineering, www.elsevier.com/locate/ijimpeng.

Mahmoud Y. Ghannam, Matt Niesluchowski, and Patrick M. Culkeen, Analysis of a Frontal Rail Structure in a Frontal Collision, The Society for Advancing Mobility Land Sea Air and Space, SAE 2002 Wold Congress, Detroit, Michigan, Mar. 4-7, 2002.

Mahmood HF, Paluszny A., Design of Thin Walled Columns for Crash Energy Management—Their Strength and Mode of Collapse. In Proc. Fourth Int. Conf. oOn Vehicle Structural Mechanics, Detroit (MI), Nov. 1981:7-18.

Wlodzimierz, Abramowicz and N. Jones, Dynamic Axial Crushing of Square Tubes, Int.J.Impact Engng., vol. 2, No. 2, pp. 179-208, 1984.

Wierzbicki T. and Abramowicz, W., On the Crushing Mechanics of Thin-Walled Structures, J. Appl.Mech. Dec. 1983, vol. 509/ pp. 727-734.

Masanori Tani and Akio Funahashi, Energy Absorption by the Plastic Deformation of Body Structural Members, SAE Technical Paper 780368. Dearborn (MI): Society of Automotive Engineers, 1978.

Y. Ohkubo, T. Akamatsu, and K. Shirasawa, Mean Crushing Strength of Closed-Hat Section Members, SAE Technical Paper 740040, Dearborn (MI): Society of Automotive Engineers, 1974.

* cited by examiner

FRONT RAIL HAVING CONTROLLED THICKNESS FOR ENERGY ABSORPTION

BACKGROUND OF THE INVENTION

1. Field of the Invention

The present invention relates to front rail structures that have controlled thickness that increases the strength of the rail structure from front to rear causing the rail to collapse during a crash event in a progressive manner instead of bending globally.

2. Background Art

Energy absorbing tubular structures are known to be used in vehicles to absorb energy during an impact event. Examples of such energy absorbing tubular structures are disclosed in U.S. Pat. Nos. 6,588,830 and 6,899,195. Energy absorbing tubular structures are seldom subjected to solely axial loading or solely bending loading during an actual collision event. Generally, the actual impact loading of a vehicle during a collision event is a combination of both axial and global bending collapse modes.

SUMMARY OF THE INVENTION

The present invention is directed to providing an improved energy absorbing front rail structure for vehicles that is designed to enable the front rail to collapse in a progressive manner from front to rear while preventing early global bending in the rail.

According to one aspect of the present invention, a front frame rail apparatus for a vehicle is provided that is attached between a frame rail and a bumper of the vehicle. The apparatus comprises at least one elongated tubular rail having a front end and a back end. The thickness of the rail varies from the front end of the rail to the back end of the rail with the compressive strength of the rail increasing from the front end of the rail to the back end of the rail.

According to another aspect of the present invention, the rail may be rectangular in shape. The thickness of the tube, or rail, is determined as follows:

$$t(x) \geq t_0 \left[ 1 + \frac{3ax\tan\beta}{b^2 + 3ab} \right]$$

where:
x is the distance from the front of the tube
$t_0$ is the initial column thickness at x=0
t(x) is the thickness of the tube at a distance x from the front of the tube
a is the height of the tube
b is the width of the tube
β is the angle between the normal direction relative to the plane of the rigid wall and the central axis of the tubular member.

According to another aspect of the invention, a front frame rail apparatus for a vehicle is provided that is attached between a frame rail and a bumper of the vehicle. The apparatus may comprise a plurality of ring-shaped tubular segments that each have a different thickness (t). The term "ring shaped" as used herein includes square, rectangular, round, oval and other tubular shapes generally. The plurality of ring-shaped tubular segments are joined together on axial ends along a common axis. Tubular segments are aligned in sequence from a front end of the apparatus to a back end of the apparatus. Each of the tubular segments has an increased thickness relative to the segment forward and adjacent to the tubular segment.

According to other aspects of the invention, a plurality of ring-shaped segments may each have a uniform length. The increasing incremental thickness of the plurality of ring-shaped segments may increase in a uniform progression.

According to another aspect of the present invention, a front frame rail apparatus for a vehicle is provided that is attached between a frame rail and a bumper of the vehicle that comprises a tubular member having a front end and a back end. The tubular member has a constant rate of increase in thickness from the front end to the back end.

According to another aspect of the invention, the rate of increase in thickness may be defined as follows:

$$t = cx + t_1, \ c > 0$$

wherein:
x=the longitudinal distance from the front end of the tubular member
t=the thickness of the tubular member at longitudinal location "x"
c=the rate of increase in thickness
$t_1$=the thickness of the tubular member at the front end.

According to still further aspects of the invention, the periphery of the outer surface of the tubular member may increase uniformly from the front end to the back end. The periphery of the inner surface of the tubular member may decrease uniformly from the front end to the back end. The periphery of the outer surface of the tubular member may increase uniformly from the front end to the back end with the inner surface of the tubular member decreasing uniformly from the front end to the back end.

According to still another aspect of the invention relating to the method of forming the tubular member, the tubular member may be formed as a tailor-welded blank that is then formed into a tubular shape. Alternatively, the tubular member may be roll formed into a blank that has increasing thickness in one direction that is rolled to form the tubular shape about an axis that is perpendicular to the one direction.

DETAILED DESCRIPTION OF THE PREFERRED EMBODIMENT(S)

Figure 1:
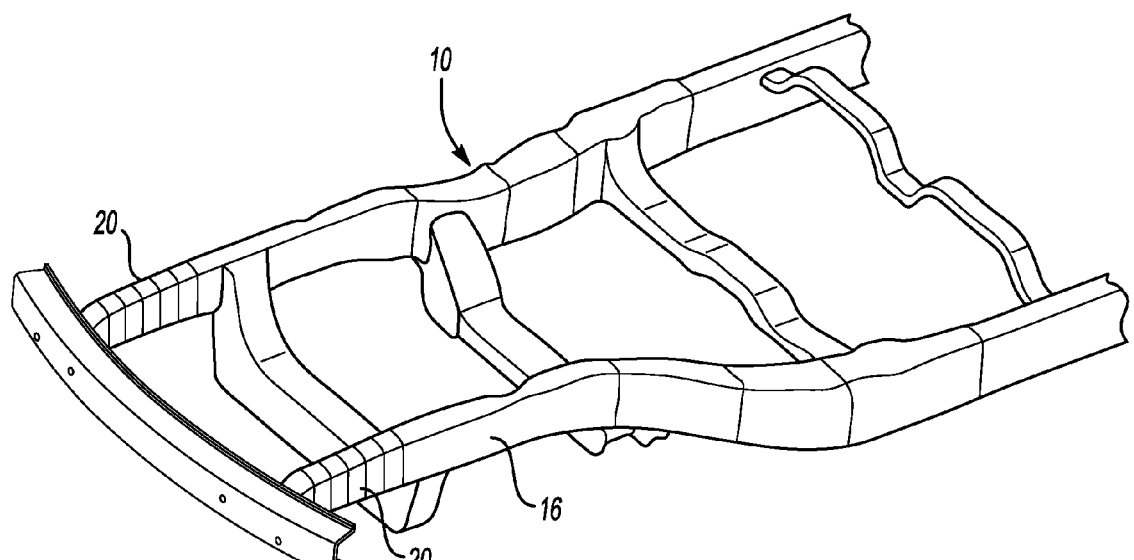
FIG. 1 is a partial front perspective view of a truck or sport utility vehicle frame.
Figure 2:
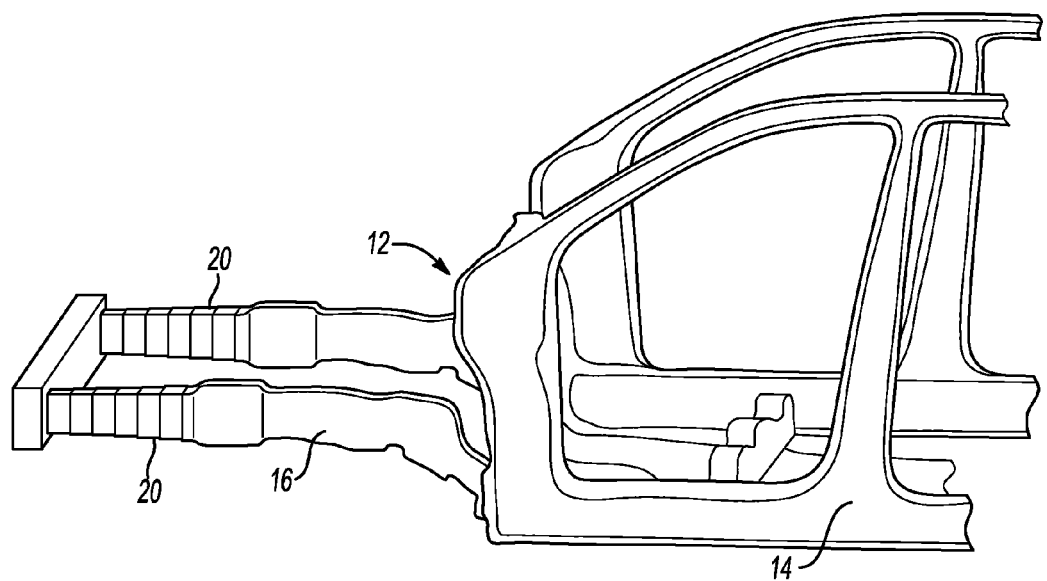
FIG. 2 is a partial front perspective view of a car frame shown with a portion of the "body-in-white" structure.

Referring to FIG. 1, a partial frame 10 of a truck or sport utility vehicle on which a body is built. Referring to FIG. 2, a partial unibody frame 12 is shown with part of a "body-in-white" unibody vehicle structure 14. Referring to both FIGS. 1 and 2, the frames 10, 12 provide or are connected to an engine mount zone 16. Both of the frames 10 and 12 are connected through the respective engine mount zones 16 to a pair of front rails 20. The front rails each have a variable thickness that may be provided in different embodiments that will be more fully described below.

Figure 3:
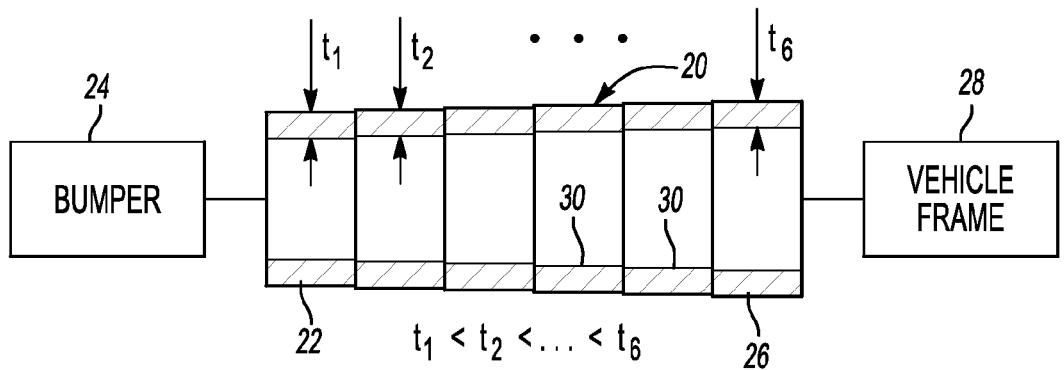
FIG. 3 is a diagrammatic cross-sectional view of a tubular rail formed as a plurality of ring-shaped segments.

Referring to FIG. 3, a diagram of a front rail, or tubular member 20, made according to one embodiment of the present invention is illustrated. A front tubular segment 22 is provided at the front end of the tubular member 20 between the tubular member 20 and a bumper 24 of the vehicle. A back tubular segment 26 is provided at the back end of the tubular member 20 that is connected through either of the engine mount zones 16 to one of the vehicle frames 10, 12. A plurality of intermediate segments 30 are provided between the front tubular segment 22 and the back tubular segment 26. The thickness $t_1$-$t_6$ of the six tubular segments increase incrementally from the front tubular segment 22 to the back tubular segment 26. In one embodiment of the invention, the incremental increase in thickness is uniform in that the increment of increase from a front tubular segment 22 to the first intermediate segment 30 is the same as incremental thickness increase for each segment up to thickness $t_6$ of the back tubular segment 26. The depiction of six segments is merely an illustrative example. More or fewer segments could be provided depending upon design and performance parameters.

The tubular segments may be square or rectangular. Alternatively, the tubular segment may be of another shape such as round or oval. The tubular member 20 is designed to manage energy during a frontal impact.

Starting at around 8 to 10 degrees, prior art rails that are designed to progressively fold in an angular frontal impact tend to buckle instead which eliminates the progressive folding of the rail. The tubular member 20 progressively folds during frontal impact crashes at angles from 0 to 40 degrees to provide progressive folding without adding weight to the rail structure. The tubular member 20 progressively folds and starts bending only beyond 45 degrees in oblique impact as more specifically described with reference to FIGS. 3-5 below.

Tubular member 20 may be manufactured as a tailor welded blank comprising a plurality of cut pieces of sheet metal that have incrementally increased thickness. Alternatively, the blank can be formed in a rolling process to obtain the thickness profile shown in FIG. 3 or 4. The cut pieces of sheet metal are welded on their edges to form a blank before being formed into a tube. The cut pieces may be laser welded or welded by other conventional welding techniques. After the segments are welded, the blank may be rolled to form a tube with desired stepped cross section. Rolling process may be performed on a tailor welded blank while leaving distinct steps between the adjacent segments. Alternatively, transition areas may be provided between the segments.

Figure 4:
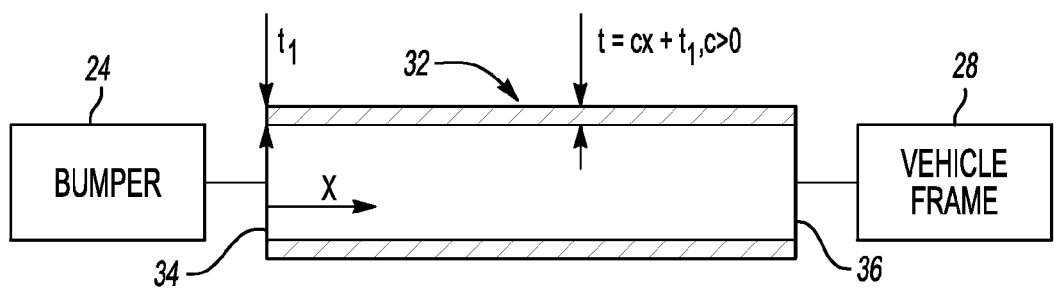
FIG. 4 is a diagrammatic cross-sectional view of a tubular member that is formed to have a uniformly increasing thickness from the front end to the back end.

Referring to FIG. 4, an alternate embodiment of the invention is shown where a tubular member 32 is provided that is formed with a constantly increasing thickness from front to rear. The thickness of the tube increases as a normal slope function, $t=cx+t_1$, $c>0$. The increase in thickness tubular member 32 has a front end 34 that is attached directly, or indirectly to a bumper 24. The tubular member 32 has a back end 36 that is attached directly, or indirectly to the vehicle frame 28. The thickness of the tubular member 32 has a variable thickness that increases to provide the progressive folding even in oblique impacts up to 45 degrees. In one embodiment of the invention, the thickness of the tubular member may increase in thickness at a constant rate. In another embodiment, the rate of increase can be non-linear, e.g., according to a quadratic function. The tubular member 32 may be rolled to provide a blank of reduced thickness. The blank is then shaped into a tube in a manufacturing process similar to the process used to form seamless pipe. Alternatively, the blank may be shaped into another cross-sectional shape, such as a C-section, a "hat-section," or the like and then assembled by conventional processes to make a rail.

Figures 5, 6:
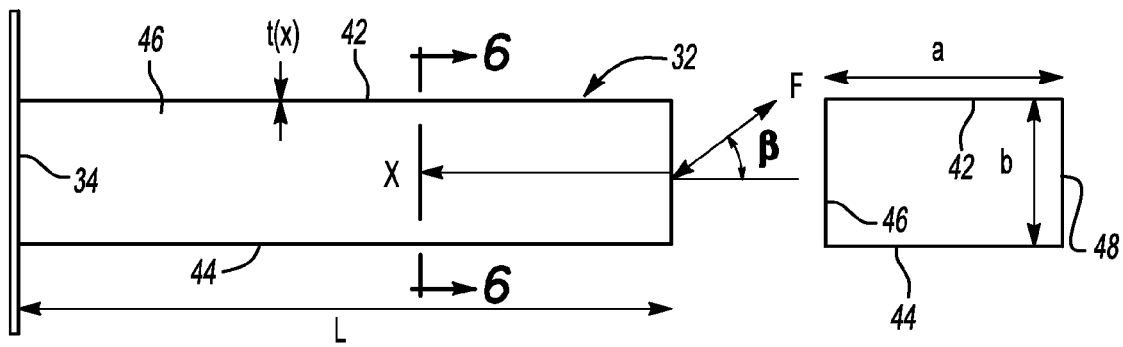
FIG. 5 is a diagram illustrating the geometry of a rectangular rail under oblique loading.
FIG. 6 is a cross-sectional view taken along the line 6-6 in FIG. 5.

Referring to FIGS. 5 and 6, the geometry of the rectangular rail 32 under oblique loading according to the present invention is illustrated. The description of the tubular rail 32 is also believed to be representative of the tubular rail 20 of FIG. 3 and references below to tubular rail 32 should be understood as being applicable to tubular rail 20. The rectangular tubular member 32 has a top wall 46 and a bottom wall 48. The walls of the tubing have a thickness $t(x)$. The height of the tubular member 32 is designated as (a). The rectangular tubular member 32 has right side wall 42 and left side wall 44. The width of the tubular member 32 is designated as (b). The angle of the oblique impact is represented by ($\beta$) which is the angle between the direction normal to the plane of the rigid wall and the central axis of the tubular member 32. (x) is the distance from the front end 34 along the axial length of the tubular member 32.

Figure 7:
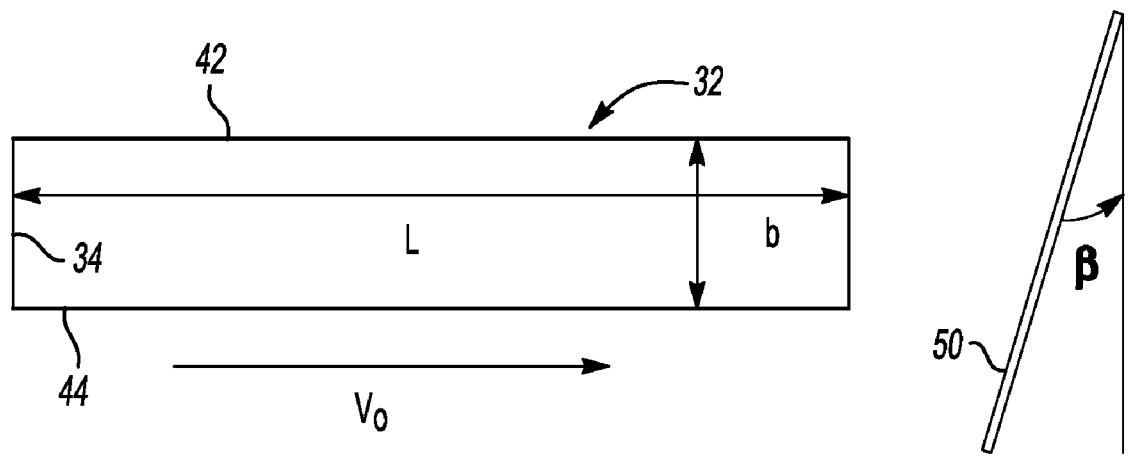
FIG. 7 is a top plan view showing the rectangular beam in a vertical configuration.

Referring to FIG. 7, a tubular member 32 is shown oriented vertically in an impact. The side walls 42 and 44 of the tube shown in FIG. 5 is oriented vertically as the tubular member 32 is driven into an obliquely oriented target impact wall 50.

Figure 8:
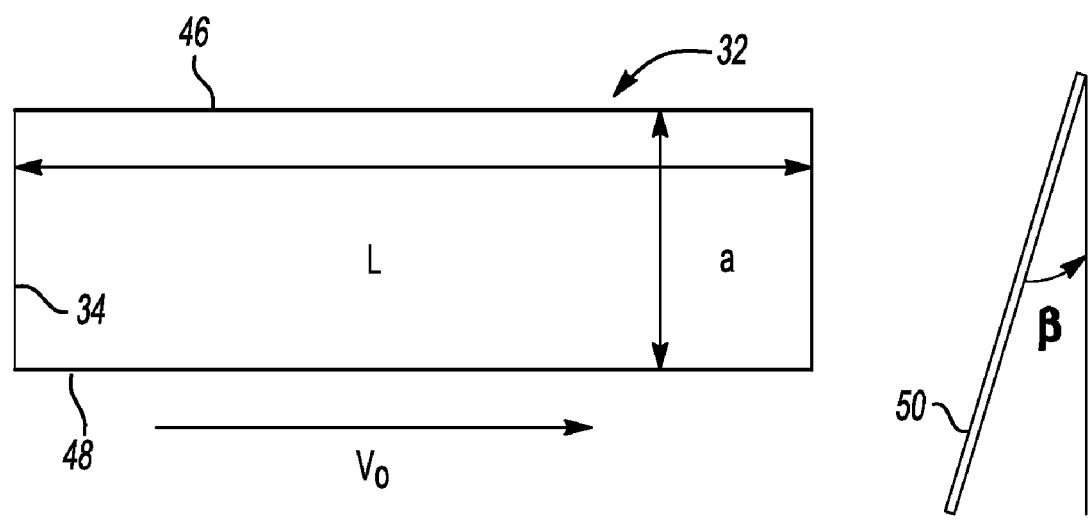
FIG. 8 is a top plan view showing a rectangular beam in a horizontal configuration.

Referring to FIG. 8, the tubular member 32 may be oriented with the top wall and bottom wall extending horizontally while driven into the obliquely oriented target impact wall 50. In either orientation, the increasing thickness of the segments or continuously increasing thickness of the tube results in progressive bending even when the force is offset by an angle up to $\beta$ of 45 degrees. Stated another way, the new designs with the constantly increasing thickness may withstand up to 45 degrees of obliquely angled force application before global bending occurs in the tubular members 22, 32.

While the above example is described in reference to a front rail assembly, the invention is believed to be equally applicable and equivalent to rear frame rails. The references to the front and rear of the rail would of course be reversed for application to rear frame rail applications.

While the best mode for carrying out the invention has been described in detail, those familiar with the art to which this invention relates will recognize various alternative designs and embodiments for practicing the invention as defined by the following claims.

What is claimed:

1. A frame for a vehicle comprising:
    a frame defining an engine mount zone;
    a front bumper;
    a pair of energy absorbing rails disposed parallel to each other and between the frame and the bumper, the energy absorbing rails extend solely in a forward direction and each have a front end and a back end, wherein the thickness of each rail varies from the front end of the rail to the back end of the rail with the compressive strength of the rail increasing from the front end of the rail to the back end of the rail, and wherein the energy absorbing rails progressively fold along a longitudinal axis of the vehicle during a frontal impact applied to the bumper at angles from 10 to 40 degrees relative to the fore and aft vehicle direction to substantially limit bending in the energy absorbing rails in a lateral direction away from the longitudinal axis of the vehicle.

2. The frame of claim 1 wherein each of the energy absorbing rails is positionally aligned only along the fore and aft direction of the vehicle to substantially limit bending in the energy absorbing rails in the lateral direction.

3. The frame of claim 1 wherein each of the energy absorbing rails includes a plurality of tubular segments between the front end and the back end of each rail, each of the tubular segments having a vertical axis and being generally symmetric about the vertical axis to substantially limit bending in the energy absorbing rails in the lateral direction.

4. The frame of claim 3 wherein each of the tubular segments has a horizontal axis and is generally symmetric about the horizontal axis to substantially limit global bending in the energy absorbing rails in the lateral direction.

5. The frame of claim 1 wherein each of the energy absorbing rails includes a plurality of tubular segments between the front end and the back end of each rail, the tubular segments closer to the bumper defining larger openings than the tubular segments farther from the bumper to facilitate progressive folding of the energy absorbing rails along the longitudinal axis of the vehicle.

6. The frame of claim 5 wherein each of the tubular segments is oriented only in the fore and aft direction of the vehicle.

7. The frame of claim 1 wherein each of the energy absorbing rails includes a plurality of tubular segments between the front end and the back end of each rail, each of the tubular segments having a thickness with thicknesses of the tubular segments increasing incrementally from the front end to the back end of the rails.

8. The frame of claim 7 wherein the thickness of each tubular segment increases incrementally in a uniform sequential progression.

9. The frame of claim 1 wherein each of the energy absorbing rails includes a plurality of tubular segments between the front end and the back end of each rail, each of the tubular segments having a top wall, a bottom wall, and a pair of side walls, the top and bottom walls being spaced a greater distance apart than the side walls.

10. The frame of claim 9 wherein the greater distance of each tubular segment increases sequentially from the front end to the back end of the rails.

11. The frame of claim 1 wherein each of the energy absorbing rails includes a plurality of ring shaped segments between the front end and the back end of each rail, the ring shaped segments having a generally uniform thickness.

12. The frame of claim 11 wherein thicknesses of the ring shaped segments increase incrementally from the front end to the back end of the rails.

13. The frame of claim 1 wherein the bumper connects to the front end of each of the energy absorbing rails.

14. The frame of claim 1 wherein each of the energy absorbing rails includes a plurality of tubular segments between the front end and the back end of each rail, each of the tubular segments having an inner surface and an outer surface, the outer surface of each tubular segment being generally uniform and uninterrupted.

15. The frame of claim 14 wherein the inner surface of each tubular segment is generally uniform and uninterrupted.

* * * * *